United States Patent
Tse et al.

(10) Patent No.: US 10,255,218 B1
(45) Date of Patent: Apr. 9, 2019

(54) SYSTEMS AND METHODS FOR MAINTAINING SPECIFIC ORDERING IN BUS TRAFFIC

(71) Applicant: Apple Inc., Cupertino, CA (US)

(72) Inventors: Yiu Chun Tse, Cupertino, CA (US); Deniz Balkan, Santa Clara, CA (US); Vinodh R. Cuppu, San Jose, CA (US); Shawn Munetoshi Fukami, Newark, CA (US); Jaideep Dastidar, San Jose, CA (US); Hengsheng Geng, Austin, TX (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/017,198

(22) Filed: Jun. 25, 2018

(51) Int. Cl.
  *G06F 13/40* (2006.01)
  *G06F 13/20* (2006.01)

(52) U.S. Cl.
  CPC .......... *G06F 13/4027* (2013.01); *G06F 13/20* (2013.01)

(58) Field of Classification Search
  None
  See application file for complete search history.

(56) References Cited

U.S. PATENT DOCUMENTS

| | | | |
|---|---|---|---|
| 4,423,480 A * | 12/1983 | Bauer | G06F 11/0745 710/100 |
| 6,453,360 B1 * | 9/2002 | Muller | H04L 29/06 370/235 |
| 6,571,308 B1 | 5/2003 | Reiss et al. | |
| 7,107,371 B1 | 9/2006 | Bell | |
| 7,631,128 B1 | 12/2009 | Sgrosso et al. | |
| 8,683,084 B2 | 3/2014 | Bubb et al. | |
| 9,229,896 B2 | 1/2016 | Balkan et al. | |
| 9,489,304 B1 | 11/2016 | Swarbrick et al. | |
| 9,870,328 B2 * | 1/2018 | Mukherjee | G06F 13/1673 |
| 2003/0126376 A1 | 7/2003 | Blankenship et al. | |
| 2004/0068603 A1 | 4/2004 | Augsburg et al. | |
| 2009/0010342 A1 * | 1/2009 | Nakano | H04N 7/163 375/240.26 |
| 2013/0185370 A1 | 7/2013 | Li et al. | |
| 2014/0089484 A1 * | 3/2014 | Chin | H04L 41/00 709/223 |
| 2014/0181349 A1 | 6/2014 | Balkan et al. | |
| 2014/0304441 A1 | 10/2014 | Balkan et al. | |
| 2015/0146648 A1 * | 5/2015 | Viger | H04L 1/1621 370/329 |
| 2018/0067877 A1 | 3/2018 | Balkan | |

OTHER PUBLICATIONS

Non-Final Office Action in U.S. Appl. No. 15/257,527, dated Oct. 3, 2018, 10 pages.

* cited by examiner

*Primary Examiner* — Michael Sun
(74) *Attorney, Agent, or Firm* — Meyertons Hood Kivlin Kowert and Goetzel PC; Rory D. Rankin (57) ABSTRACT

A system and method for efficiently bridging two communication protocols. In various embodiments, a computing system includes an interconnect for routing traffic among agents and endpoints. The agents use a first communication protocol and the endpoints use a second communication protocol that differs from the first protocol with regard to at least the ordering that is enforced between transactions. A bridge selects transactions of a first type and a second type used in the first protocol for processing based on the first protocol ordering while using acknowledgments used by the second protocol.

20 Claims, 9 Drawing Sheets

SYSTEMS AND METHODS FOR MAINTAINING SPECIFIC ORDERING IN BUS TRAFFIC

BACKGROUND

Technical Field

Embodiments described herein relate to the field of computing systems and, more particularly, to efficiently bridging two communication protocols.

Description of the Related Art

Systems on chips (SoCs) are becoming increasingly complex with ever increasing numbers of agents within a typical SoC and available endpoints. The agents include one or more of multimedia engines, digital signal processors (DSPs) and processing units, each with one or more of a central processing unit (CPU) and a data parallel processor like a graphics processing unit (GPU). Endpoints include input/output (I/O) peripheral devices such as memory devices, communication interfaces such as radio communication interfaces, speakers, displays and so on. Data is shared among the different agents of the SoC and among the available endpoints. When an agent is generating and sending multiple transactions through the bus fabric, the agent expects the transactions to be processed in a particular order compared to how they were generated.

The order of the transactions is based on a communication protocol. However, multiple communication protocols are available with some of the protocols adopted as standard protocols. The different communication protocols use different ordering for the processing of transactions. When an agent uses a first communication protocol and an endpoint uses a different, second communication protocol, the processing order of the transactions at the endpoint differs from the expected order by the agent. Therefore, proper functioning is not achieved.

In view of the above, efficient methods and mechanisms for efficiently bridging two communication protocols are desired.

SUMMARY

Systems and methods for efficiently bridging two communication protocols are contemplated. In various embodiments, a computing system includes an interconnect for routing traffic among one or more agents and one or more endpoints. In some embodiments, the one or more agents use a first communication protocol, whereas the one or more endpoints use a second communication protocol different from the first communication protocol. The first and second communication protocols differ from one another with regard to at least the ordering that is enforced between transactions.

In some embodiments, the first communication protocol (or the first protocol) uses posted transactions and non-posted transactions. Posted transactions are transactions that do not require an acknowledgement of completion. Non-Posted transactions are transactions that require an acknowledgement of completion. In some embodiments, the second protocol uses independent channels for write requests and read requests. Each of the write requests and the read requests require an acknowledgment of completion.

In an embodiment, each of the one or more endpoints includes a bridge. In other embodiments, the bridge is located elsewhere in the computing system and the conversion between the first and second communication protocols occurs elsewhere in the computing system. The bridge stores received posted transactions in a first queue and stores received non-posted transactions in a second queue. In various embodiments, the bridge selects transactions from the first queue and the second queue for processing such that each posted transaction in the first queue older than a given non-posted transaction in the second queue completes with an acknowledgment of completion based on the second protocol prior to selecting the given non-posted transaction in the second queue.

When stored transactions are selected, these transactions are sent in an order based on age with the oldest transaction being sent first. The bridge includes an interface for sending the selected transactions for processing where the interface supports the second protocol. For example, the interface supports communication parameters such as supported transfer sizes, supported burst transfer sizes, supported clock domains, supported interrupt mechanisms, and so forth of the second protocol. In an embodiment, the first protocol uses a peripheral component interconnect (PCI) based bus protocol (e.g., which includes PCI Express (PCIe)). In other embodiments, one of a variety of other bus protocols is used for the first protocol. In an embodiment, the second protocol uses the Advanced eXtensible Interface (AXI) protocol. In other embodiments, one of a variety of other bus protocols is used for the second protocol.

In an embodiment, the bridge also sends selected non-posted transactions in an order based on age with the oldest transaction being sent first. The bridge maintains a count of non-posted transactions of a particular type (e.g., read transaction type). Any non-posted write transactions are not selected and sent for processing until an acknowledgment of completion is received for each previous non-posted read transaction. In an embodiment, the count is decremented for each acknowledgment of completion received for the non-posted read transactions, and any non-posted write transactions are not selected and sent for processing until the count returns to zero.

These and other embodiments will be further appreciated upon reference to the following description and drawings.

BRIEF DESCRIPTION OF THE DRAWINGS

The above and further advantages of the methods and mechanisms may be better understood by referring to the following description in conjunction with the accompanying drawings, in which.

While the embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. § 112(f) for that unit/circuit/component.

DETAILED DESCRIPTION OF EMBODIMENTS

In the following description, numerous specific details are set forth to provide a thorough understanding of the embodiments described in this disclosure. However, one having ordinary skill in the art should recognize that the embodiments might be practiced without these specific details. In some instances, well-known circuits, structures, and techniques have not been shown in detail for ease of illustration and to avoid obscuring the description of the embodiments.

Figure 1:
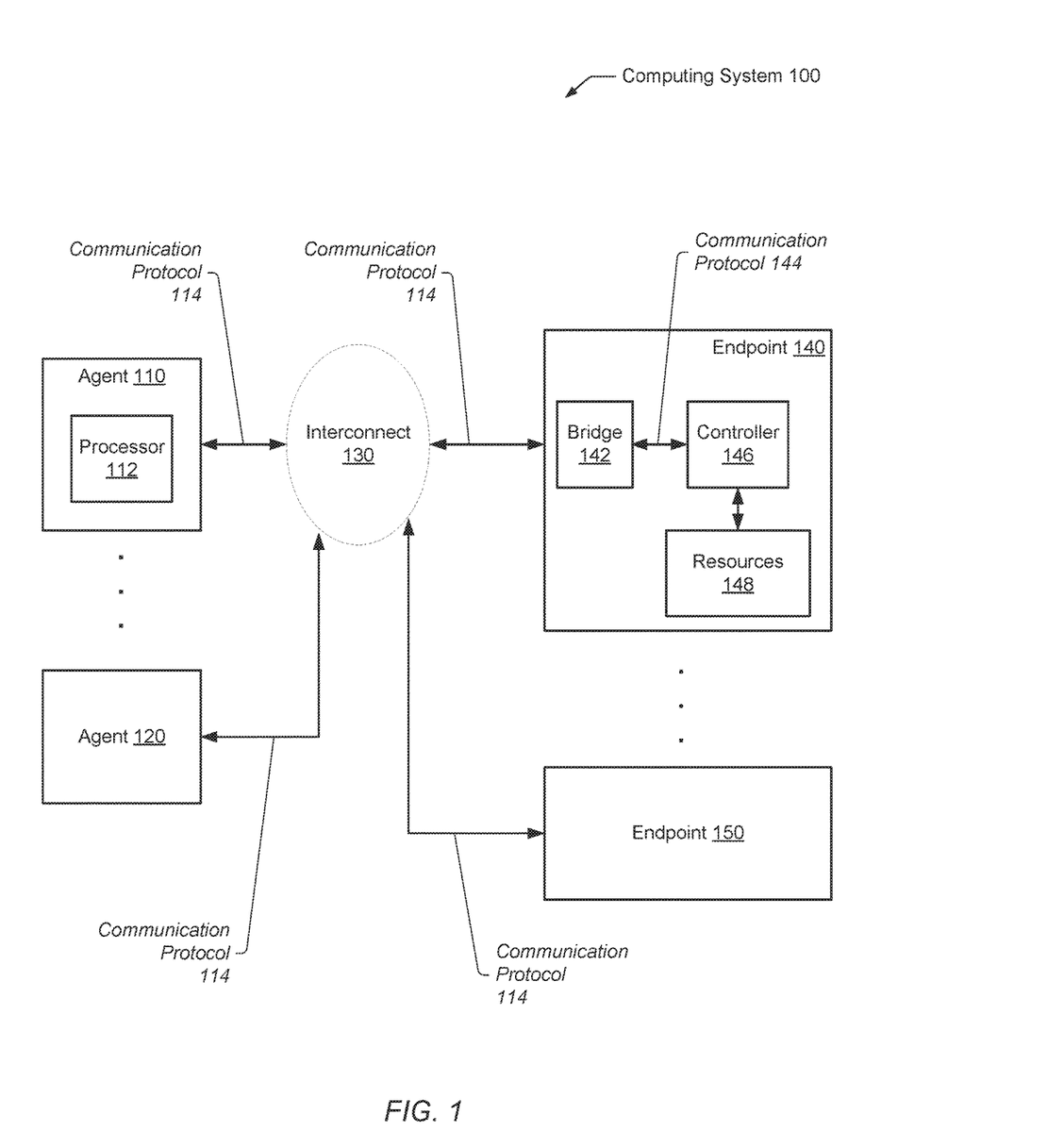
FIG. 1 is a block diagram of one embodiment of a computing system.

Referring to FIG. 1, a generalized block diagram of one embodiment of a computing system 100 is shown. In the illustrated embodiment, interconnect 130 routes traffic among agents 110-120 and endpoints 140-150. In an embodiment, communication protocol 114 is used by the interconnect 130 and the interfaces on each of the agents 110-120 and endpoints 140-150. Each of the endpoints 140-150 use communication protocol 144 different from communication protocol 114. In various embodiments, bridge 142 maintains a particular order of transactions based on communication protocol 114 although transactions are sent to controller 146 based on communication protocol 144. In other embodiments, bridge 142 is located elsewhere in computing system 100 and the conversion between communication protocols 114 and 144 occurs elsewhere in computing system 100.

In various embodiments, the computing system 100 is a system on a chip (SoC) that includes multiple types of integrated circuits on a single semiconductor die, each integrated circuit providing a separate functionality. In some embodiments, computing system 100 is also referred to as an application specific integrated circuit (ASIC), or an apparatus. In other embodiments, the agents 110-120 and endpoints 140-150 are individual dies within a package such as a multi-chip module (MCM). In yet other embodiments, the agents 110-120 and endpoints 140-150 are individual dies or chips on a printed circuit board.

Clock sources, such as phase lock loops (PLLs), interrupt controllers, and so forth are not shown in FIG. 1 for ease of illustration. It is also noted that the number of components of the computing system 100 (and the number of subcomponents for those shown in FIG. 1, such as within each of agent 110 and endpoint 140), vary from embodiment to embodiment. In other embodiments, there are more or fewer of each component/subcomponent than the number shown for the computing system 100. In an embodiment, each of the agents 110-120 is a processor complex. The term "processor complex" is used to denote a configuration of one or more processor cores using local storage (not shown), such as a local shared cache memory subsystem, and capable of processing a workload together. For example, in an embodiment, the workload includes one or more programs comprising instructions executed by processor 112. Any instruction set architecture is implemented in various embodiments.

Each of the agents 110-120 includes a processor such as processor 112. Although a single processor is shown, in various embodiments, multiple processors are used, each with one or more processor cores. Processor 112 is one or more of a central processing unit (CPU), a data parallel processor like a graphics processing units (GPU), a digital signal processors (DSP), a multimedia engine, and so forth. In some embodiments, components within agent 120 are similar to components in agent 110. In other embodiments, components in agent 120 are designed for lower power consumption, and therefore, include control logic and processing capability producing less performance. In such embodiments, supported clock frequencies are less than supported clock frequencies in agent 110. In addition, one or more of the processor cores in agent 120 include a smaller number of execution pipelines and/or functional blocks for processing relatively high power consuming instructions than what is supported by the processor cores in agent 110.

In various embodiments, agents 110-120 and endpoints 140-150 transfer messages and data to one another through interconnect 130. In some embodiments, interconnect 130 is a communication fabric (or fabric), which includes multiple levels of fabric mulitplexers (or muxes). In such embodiments, agents 110-120 and endpoints 140-150 include fabric interface units. Different types of traffic flows independently through a communication fabric. In some embodiments, a communication fabric utilizes a single physical fabric bus to include a number of overlaying virtual channels, or dedicated source and destination buffers, each carrying a different type of traffic. Each channel is independently flow controlled with no dependence between transactions in different channels. In other embodiments, the communication fabric is packet-based, and may be hierarchical with bridges, cross bar, point-to-point, or other interconnects.

As shown, interconnect 130 uses a communication protocol 114. In an embodiment, each of the agents 110-120 and endpoints 140-150 include communication interface units, such as fabric interface units, which also use communication protocol 114. In some embodiments, communication protocol 114 is a bus protocol used for transferring messages and data, enforcing an order between transactions with particular transaction types, and ensuring cache coherence among the different agents 110-120 and endpoints 140-150. In an embodiment, communication protocol 114 uses the bus protocol peripheral component interconnect (PCI), which includes PCI Express (PCIe). In other embodiments, one of a variety of other bus protocols is used.

Endpoints 140-150 are representative of any number and type of components coupled to interconnect 130. For example, in some embodiments, endpoints 140-150 include one or more cameras, flash controllers, display controllers, media controllers, graphics units, communication interfaces such as radio communication interfaces, and/or other devices. Endpoints 140-150 are also representative of any number of input/output (I/O) interfaces or devices and provide interfaces to any type of peripheral device implementing any hardware functionality included in computing system 100. For example, in an embodiment, any of the endpoints 140-150 connect to audio peripherals such as microphones, speakers, interfaces to microphones and speakers, audio processors, digital signal processors, mixers, etc. Other I/O devices include interface controllers for various interfaces external to computing system 100, including interfaces such as Universal Serial Bus (USB), peripheral component interconnect (PCI) including PCI Express (PCIe), serial and parallel ports, general-purpose I/O (GPIO), a universal asynchronous receiver/transmitter (uART), a FireWire interface, an Ethernet interface, an analog-to-digital converter (ADC), a digital-to-analog converter (DAC), and so forth. Other I/O devices include networking peripherals such as media access controllers (MACs).

In yet other embodiments, one or more of endpoints 140-150 include memory controllers for interfacing with system memory or separate memory such as a portable flash memory device. The memory controller includes any number of memory ports, generates proper clocking to memory devices, and interfaces to dynamic random access memory (DRAM) such as synchronous DRAM (SDRAM) (including mobile versions of the SDRAMs such as mDDR3, etc., and/or low power versions of the SDRAMs such as LPDDR4, etc.), RAMBUS DRAM (RDRAM), double data rate (DDR) SDRAM, DDR2 SDRAM, Rambus DRAM (RDRAM), static RAM (SRAM), GDDR4 (Graphics Double Data Rate, version 4) SDRAM, GDDR5 (Graphics Double Data Rate, version 5) SDRAM, etc.

In an embodiment, each of the endpoints 140-150 include a bridge 142 for interfacing with interconnect 130, a controller 146 and resources 148. In some embodiments, controller 146 is one of a variety of types of processors. In other embodiments, controller 146 is a dedicated controller, such as a microcontroller, for resources 148. In various embodiments, resources 148 are circuitry and/or other hardware as described earlier such as memory devices, pipelines for processing audio or video data, and so forth. As shown, endpoints 140-150 use a second type of communication protocol 144 different from communication protocol 114 for transferring messages and data. The communication protocols 114 and 144 differ from one another with regard to one or more communication parameters such as allowable transfer sizes, supported burst transfer sizes, supported directions for simultaneous transfers, allowable number of outstanding requests while sending more requests, support of out-of-order completions, supported clock domains, supported interrupt mechanisms, and so forth.

In some embodiments, communication protocol 114 uses the bus protocol PCI Express (PCIe) while communication protocol 144 uses the bus protocol Advanced eXtensible Interface (AXI) protocol. Accordingly, the ordering between transactions is enforced in different manners. For example, in some embodiments, communication protocol 114 (or protocol 114) allows particular write requests to pass read requests, but protocol 114 does not expect read requests to pass the particular write requests. In an embodiment, whether the requests require an acknowledgment response for completion is a factor used for distinguishing between transaction types and identifying these particular write requests. In some embodiments, protocol 144 within endpoints 140 and 150 uses independent channels for write requests and read requests. In other embodiments, communication protocol 114 and communication protocol 144 use different bus protocols than the PCIe protocol and the AXI protocol, but the above characteristics and dependences are still present.

In various embodiments, bridge 142 maintains a particular order of transactions based on protocol 114 although transactions are sent to controller 146 based on protocol 144. Bridge 142 facilitates communication between the different protocols 114 and 144 by converting transactions as they go back and forth over the different protocols 114 and 144 and enforcing an order between the read and write transactions from agents 110-120. In other embodiments, one or more of bridge 142 and other bridges in computing system 100 are located in other locations other than inside endpoints 140-150.

Figure 2:
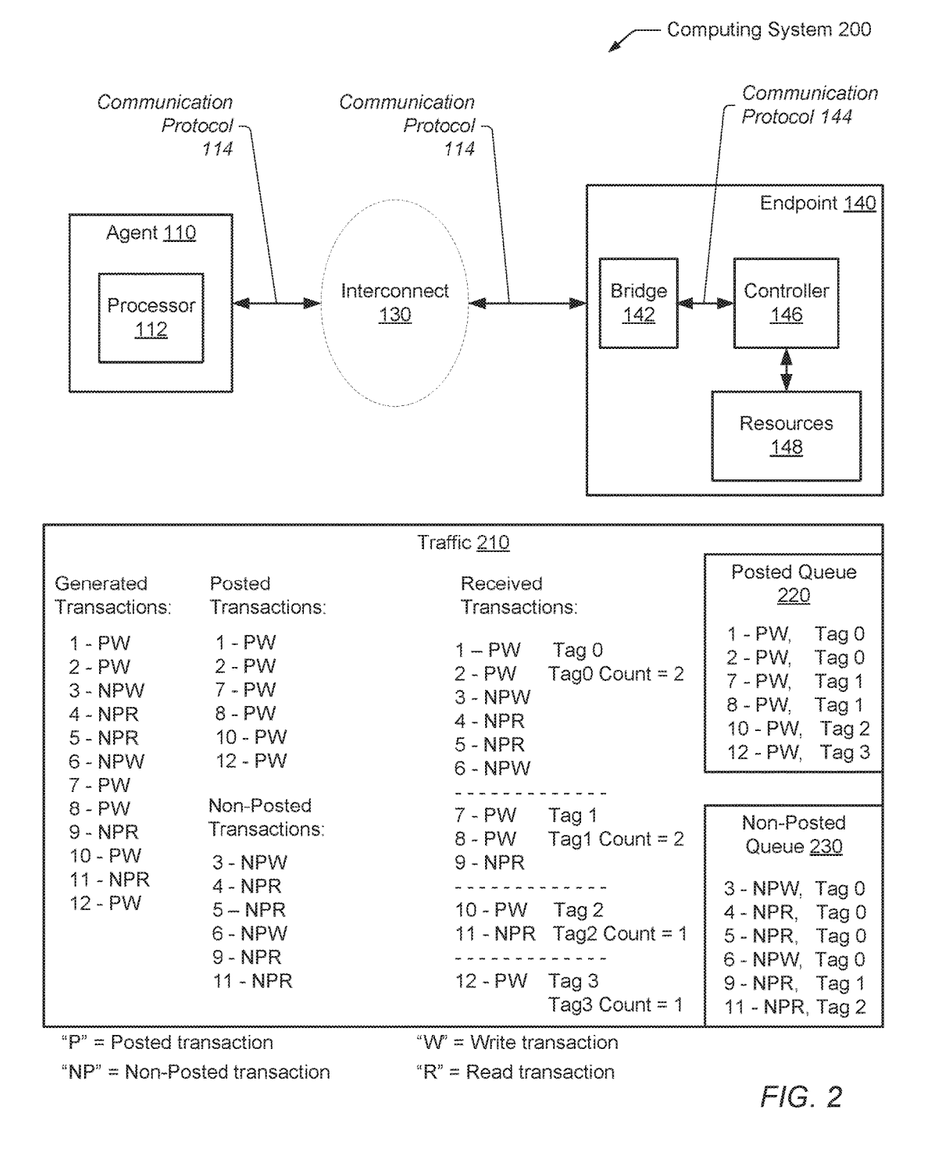
FIG. 2 is a block diagram of one embodiment of a computing system.

Referring to FIG. 2, a generalized block diagram of one embodiment of a computing system 200 is shown. Components and circuitry already described are numbered identically. Although only a single agent, such as agent 110, and a single endpoint, such as endpoint 140, are shown, in other embodiments, any number of agents and endpoints are included in computing system 200. As shown, processor 112 in agent 110 generates multiple transactions, which are received by bridge 142 in endpoint 140. Traffic 210 includes these multiple transactions as they are generated in agent 110 and sent to endpoint 140 via interconnect 130. In some embodiments, bridge 142 receives the transactions using protocol 114, stores the transactions according to protocol 114, and then selects transactions for processing based on both protocols 114 and 144 while using acknowledgments used by protocol 144. A further description is provided in the below discussion.

In the illustrated embodiment, processor 112 generates twelve transactions numbered from 1 to 12. This numbering indicates an age of the transactions. For example, the oldest generated transaction is the posted write transaction indicated by "1-PW." The younger generated transaction is the posted write transaction indicted by "12-PW." In an embodiment, processor 112 generates both posted transactions and non-posted transactions. Posted transactions are transactions where agent 110, which generated the posted transaction, does not expect to receive an indication of completion of the transaction. If the receiver, such as endpoint 140, is unable to complete the posted transaction, or otherwise encounters an error, in an embodiment, agent 110 is not notified. In other embodiments, endpoint 140 notifies agent 110 about the error. However, when completion occurs successfully, no indication is sent to agent 110. Examples of posted transactions are messages and memory write operations. In the illustrated embodiment, the first two generated transactions are posted memory write transactions indicated by "1-PW" and "2-PW."

Non-Posted transactions are transactions where agent 110, which generated the non-posted transaction, expects to receive an acknowledgment of completion of the transaction. If the receiver, such as endpoint 140, is unable to complete the non-posted transaction, or otherwise encounters an error, agent 110 is notified with an error message. Similarly, when completion occurs successfully, endpoint 140 sends an indication to agent 110. Examples of non-posted transactions are memory read operations, memory read lock operations, input/output (I/O) read and write operations, and configuration read and write operations. For transactions including read requests, the indication of completion includes the requested data. In the illustrated embodiment, the third generated transaction is a non-posted memory write transaction indicated by "3-NPW" and the fourth generated transaction is a non-posted memory read transaction indicated by "4-NPR."

In the illustrated embodiment, agent 110 has generated six posted transactions, which are transactions 1, 2, 7, 8, 10 and 12. Additionally, agent 110 has generated six non-posted transactions, which are transactions 3-6, 9 and 11. In various embodiments, the ordering of posted transactions maintains an age ordering with respect to other posted transactions. Similarly, the ordering of non-posted transactions maintains an age ordering with respect to other non-posted transactions. However, posted transactions younger than a given non-posted transaction are permitted to be selected for processing ahead of the older given non-posted transaction. In contrast, no non-posted transaction younger than a given posted transaction is permitted to be selected for processing ahead of the given posted transaction. In various embodiments, non-posted transactions including the indications of completion and any requested data follow the above rules too. One example of a protocol supporting the above rules for posted and non-posted transactions is the PCIe protocol. However, other examples of bus protocols supporting the above ordering dependence rules for posted and non-posted transactions are also possible and contemplated for use in computing system 200.

In contrast to the above, other protocols send transactions for processing based on the operation type such as read and write operations. An example of a protocol supporting these rules based on the operation type and separate physical buses for the different operation types for transactions is the Advanced eXtensible Interface (AXI) protocol. However, other examples of bus protocols supporting these ordering dependence rules based on the operation type and separate physical buses for the different operation types are also possible and contemplated for use in computing system 200. As shown, endpoint 140 groups the received transactions into a posted group and a non-posted group. In order not to ignore the ordering of the processing of the transactions as specified by protocol 114, bridge 142 generates tags and maintains counts corresponding to these tags.

In the illustrated embodiment, as bridge 142 receives the twelve transactions, bridge 142 is aware of the age ordering among the twelve transactions and groups the transactions. As shown, bridge 142 defines a new group when a given transaction is a posted transaction and a most previous transaction with respect to the given transaction is a non-posted transaction. In the illustrated embodiment, a new group forms between transaction 6, which is a non-posted write transaction indicated by "6-NPW," and transaction 7, which is a posted write transaction indicated by "7-PW." Therefore, the first six transactions 1-6 are grouped together in a first group indicated by "tag 0." The groups are set when bridge 142 determines a transition from a non-posted transaction to a posted transaction using age ordering. This type of transition occurs between transactions 6 and 7, between transactions 9 and 10, and between transactions 11 and 12.

Bridge 142 groups transactions 7-9 together in a second group, transactions 10-11 are grouped together in a third group, and transaction 12 is grouped in a fourth group. Each group is assigned a unique tag. Here, the tags are simply numbered beginning at 0, but in other embodiments, a variety of other values, offsets and concatenations of values are used for creating a unique tag. As shown, the first group with transactions 1-6 is assigned a tag value of 0 such as "tag 0." The other groups of transactions are also assigned unique tags such as tags 1-3.

In addition to generating and assigning unique tags to the groups of transactions, in an embodiment, bridge 142 maintains a tag counter for each of the unique tags, and accordingly, for each of the identified groups of transactions. The tag counts indicate a number of posted transactions in the group. For example, there are 2 posted transactions in the group of transactions 1-6 with tag 0. The posted transactions include a posted write transaction "1-PW," and another posted write transaction "2-PW." The tag counts for the other groups are determined in a similar manner.

In various embodiments, the received transactions and corresponding tags generated by bridge 142 are stored in entries of one of a posted queue 220 or other buffer and a non-posted queue 230 or other buffer. In some embodiments, bridge 142 selects transactions from the posted queue 220 and the non-posted queue 230 for processing based on protocol 114 using the tags and the tag counters while using acknowledgments used by protocol 144. Protocol 144 uses acknowledgments for each transaction, and therefore, does not process transactions as posted transactions during the processing of transactions. In various embodiments, protocol 144 uses separate physical buses for read transactions and write transactions. To ensure age ordering, bridge 142 ensures a transaction of one type (e.g., read) cannot be selected and conveyed for processing while there are outstanding transactions of the opposite type (e.g., write). Bridge 142 selects transactions for processing such that each transaction in the posted queue 220 older than a given transaction in the non-posted queue 230 completes with an acknowledgment based on protocol 144 prior to selecting the given transaction in the non-posted queue 230. In various embodiments, the ordering of posted transactions maintains an age ordering with respect to other posted transactions. Similarly, the ordering of non-posted transactions maintains an age ordering with respect to other non-posted transactions. In some embodiments, protocol 144 maintains this age ordering.

In one example, the first two posted transactions 1-2 ("1-PW" and "2-PW") in the posted queue 220 are selected for processing, conveyed from the posted queue 220 to controller 146, and corresponding acknowledgment packets or other messages are returned to bridge 142 prior to the non-posted transaction "3-NPW" is selected for processing and conveyed to controller 146. However, in other examples, the third posted transaction "7-PW" is also selected for processing, conveyed from the posted queue 220 to controller 146, and a corresponding acknowledgment packet or other message is returned to bridge 142 prior to the non-posted transaction "3-NPW" is selected for processing and conveyed to controller 146. In some examples, one or more other younger posted transactions of "8-PW," "10-PW," and "12-PW" are selected for processing and conveyed to controller 146 and receive acknowledgments prior to the non-posted transaction "3-NPW" is selected for processing.

At least the first two posted transactions are selected for processing prior to the selection of the non-posted transaction "3-NPW," since the first two posted transactions are older than the non-posted transaction "3-NPW." Whether more posted transactions, such as posted transactions younger than the non-posted transaction "3-NPW," are selected prior to the selection of the non-posted transaction "3-NPW" is based on attributes of the transactions at the heads of the queues 220 and 230. In an embodiment, the attributes include one or more a priority level, a quality-of-service parameter, a source identifier, an application identifier or type, such as a real-time application, an indication of traffic type, such as real-time traffic or low latency traffic or bulk traffic, and an indication of a data size associated with the request, and so forth.

In an embodiment, bridge 142 determines the tag at the head of the posted queue 220 and the non-posted queue 230 is tag 0, so the tags at the head of the two queues 220 and 230 match. Additionally, the tag count corresponding to tag 0 is non-zero, or two in this case. Therefore, bridge 142 begins with posted queue 220 for selecting transactions to send for processing. Bridge 142 sends one or more of the posted write transactions 1-2 with tag 0 to controller 146. In an embodiment, when the posted write transactions are sent to controller 146 and the corresponding acknowledgments based on protocol 144 are received, the tag count corresponding to tag 0 is decremented by the number of acknowledgments received. In other embodiments, the count is incremented by the number of acknowledgments received.

In one case, when the tag counter corresponding to tag 0 reaches a threshold, such as being decremented to zero, the second posted write transaction "2-PW" has been deallocated from the posted queue 220. In such a case, bridge 142 determines that the posted write transaction "7-PW" is reached, or at the head of posted queue 220. Additionally, bridge 142 determines that the tag (tag 1) at the head of the posted queue 220 does not match the tag (tag 0) at the head of the non-posted queue 230. At this time, the non-posted write transaction "3-NPW" is still at the head of the non-posted queue 230. In this case, bridge 142 is able to select transactions from either the posted queue 220 or the non-posted queue 230. As described earlier, in an embodiment, the selection of which queue from which to select transactions to send for processing is based on one or more attributes of the transactions. Examples of these attributes were provided earlier.

Therefore, in one example, bridge 142 continues to select from the posted queue 220 when the tags do not match. However, in another example when the tags do not match, bridge 142 switches to sending transactions from the posted queue 220 to sending transactions from the non-posted queue 230.

In an embodiment, when bridge 142 switches to non-posted queue 230 for selecting transactions for processing, the non-posted write transaction "3-NPW" is sent for processing. An indication, such a type bit, is set to indicate a write type versus a read type. A type counter (not shown) is incremented by one. The next transaction, which is the non-posted read transaction "4-NPR," does not have a write type as indicated by the set indication or type bit. Therefore, no further transactions are sent from queue 230 for processing until an acknowledgment using the protocol 144 is received for the outstanding non-posted write transaction "3-NPW." When this acknowledgment is received, in an embodiment, the type counter decrements from one to zero.

In one example, since the non-posted read transaction "4-NPR" has the same tag 0, it is selected for processing and sent to controller 146. An indication, such the type bit, is set to indicate a read type versus a write type. A type counter (not shown) is incremented by one. However, in another example, since the tags at the heads of posted queue 220 (tag=1) and non-posted queue 230 (tag=0) still do not match, bridge 142 is able to select a posted transaction if one or more attributes provide a higher priority for the posted transaction over the non-posted read transaction "4-NPR." The possible interjection of one or more posted transactions being selected prior to a non-posted transaction continues while the tags at the heads of the posted queue 220 and non-posted queue 230 do not match.

The next non-posted transaction, which is the non-posted read transaction "5-NPR," also has a read type equal to the read type indicated by the set indication or type bit. Therefore, the transaction "5-NPR" is sent to controller 146 for processing, and the type counter is incremented from one to two. The next transaction, which is the non-posted write transaction "6-NPW," does not have a read type as indicated by the set indication or type bit. Therefore, no further transactions are sent from non-posted queue 230 for processing until acknowledgments using the protocol 144 are received for the outstanding non-posted read transactions "4-NPR" and "5-NPR." When these acknowledgments are received, in an embodiment, the type counter decrements from two to zero. Since the non-posted write transaction "6-NPW" has the same tag 0, it is selected for processing and sent to controller 146 unless one or more posted transactions are selected beforehand due to the tags at the heads of the of the posted queue 220 and non-posted queue 230 do not match. An indication, such the type bit, is set to indicate a write type versus a read type when the non-posted write transaction "6-NPW" is selected. The type counter (not shown) is incremented by one.

The next transaction, which is the non-posted read transaction "9-NPR," has a different tag such as tag 1 versus tag 0. Therefore, no further transactions are sent from non-posted queue 230 for processing until an acknowledgment using the protocol 144 is received for the outstanding non-posted write transaction "6-NPW." When this acknowledgment is received, in an embodiment, the type counter decrements from one to zero. The non-posted read transaction "9-NPR" has the different tag 1 than the tags of the previous non-posted transactions. This different tag matches the tag at the head of posted queue 220 if one of the posted transactions "7-PW" and "8-PW" is at the head of posted queue 220. When the tags at the heads of posted queue 220 and non-posted queue 230 match, selection of transactions to send for processing uses posted queue 220. In this example, the next transaction selected for processing is one of the posted write transaction "7-PW" or "8-PW" with tag 1. The selection process continues as described transitioning between queues 220 and 230 and using acknowledgment signals or messages based on protocol 144.

Figure 3:
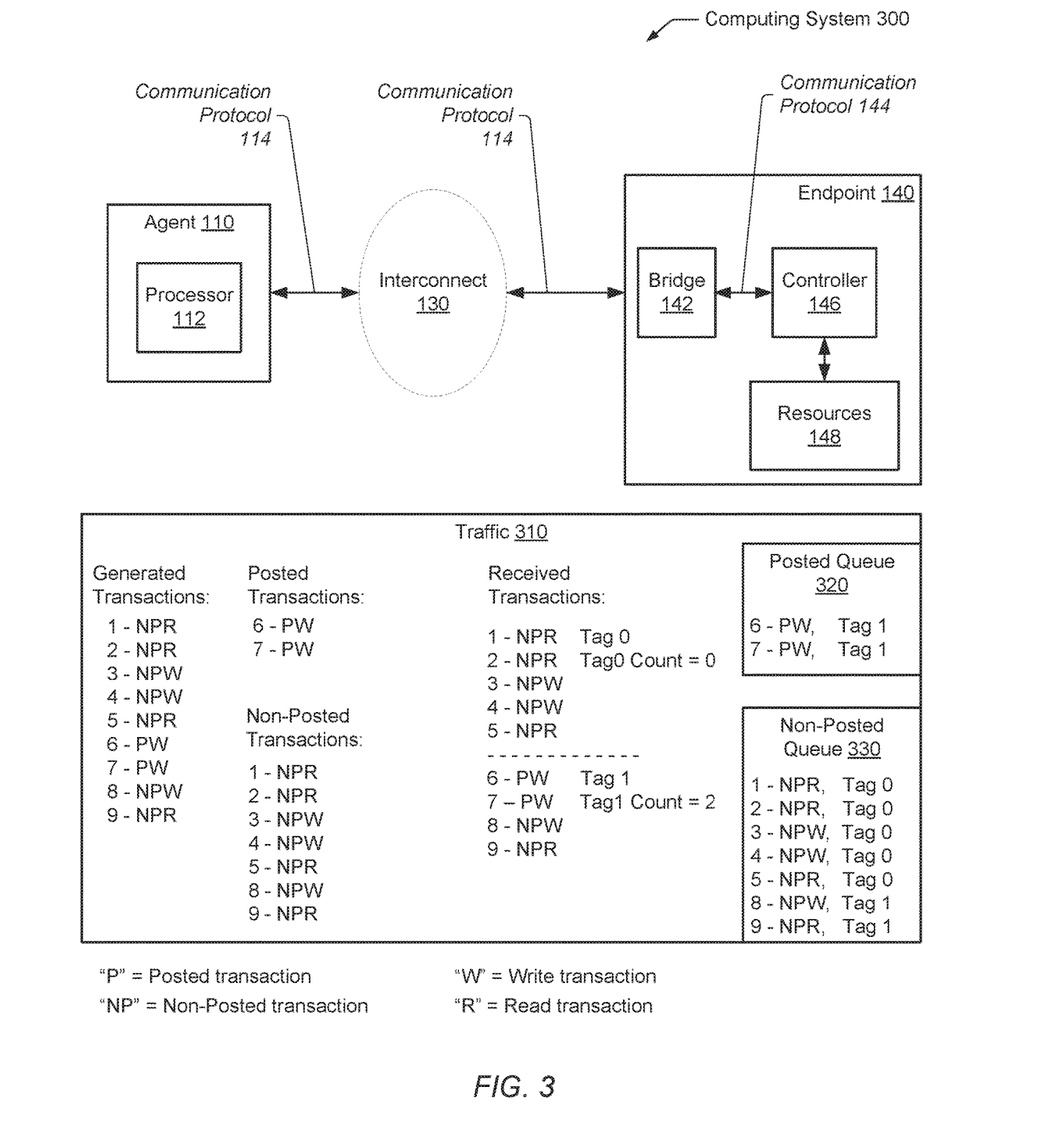
FIG. 3 is a block diagram of one embodiment of a computing system.

Referring to FIG. 3, a generalized block diagram of one embodiment of a computing system 300 is shown. Components and circuitry already described are numbered identically. As shown, processor 112 in agent 110 generates multiple transactions, which are received by bridge 142 in endpoint 140. Traffic 310 includes these multiple transactions as they are generated in agent 110 and sent to endpoint 140 via interconnect 130. In the illustrated embodiment, as bridge 142 receives the nine transactions generated by processor 112, bridge 142 is aware of the age ordering among the nine transactions and groups the transactions. As shown, bridge 142 places transactions 1-5 together in a first group with tag 0, and places transactions 6-9 in a second group with tag 1.

In addition to generating and assigning unique tags to the groups of transactions, in an embodiment, bridge 142 maintains a tag counter for each of the unique tags, and accordingly, for each of the identified groups of transactions. The tag counts indicate a number of posted transactions in the group. For example, there are 0 posted transactions in the group of transactions 1-5 with tag 0, and there are 2 posted transactions in the group of transactions 6-9 with tag 1.

In various embodiments, the received transactions and corresponding tags generated by bridge 142 are stored in entries of one of a posted queue 320 or other buffer and a non-posted queue 330 or other buffer. In some embodiments, bridge 142 selects transactions from the posted queue 320 and the non-posted queue 330 for processing based on protocol 114 using the tags and the tag counters while using acknowledgments used by protocol 144.

In an embodiment, bridge 142 determines the tag (tag 1) at the head of the posted queue 320 and the tag (tag 0) at the head of the non-posted queue 330 differ. The tags at the head of the two queues 320 and 330 do not match. Therefore, bridge 142 selects one of posted queue 320 and non-posted queue 330 for selecting transactions based on attributes of the transactions at the heads of posted queue 320 and non-posted queue 330. As described earlier, in an embodiment, the attributes include one or more a priority level, a quality-of-service parameter, a source identifier, an application identifier or type, such as a real-time application, an indication of traffic type, such as real-time traffic or low latency traffic or bulk traffic, and an indication of a data size associated with the request, and so forth.

In one example, bridge 142 begins with non-posted queue 330 for selecting transactions to send for processing. The selection steps are performed in a similar manner as described for traffic 210 (of FIG. 2). For example, bridge 142 selects the non-posted read transaction "1-NPR" with tag 0 and sends it to controller 146 for processing. An indication, such a type bit, is set to indicate a read type versus a write type. A type counter (not shown) is incremented by one.

The possible interjection of one or more posted transactions being selected prior to a non-posted transaction continues while the tags at the heads of the posted queue 320 and non-posted queue 330 do not match. In one example, bridge 142 selects anther non-posted transaction based on the above examples of attributes. The next transaction, which is the non-posted read transaction "2-NPR," has a read type as indicated by the set indication or type bit. Therefore, the transaction "2-NPR" is sent to controller 146 for processing, and the type counter is incremented from one to two. The next transaction, which is the non-posted write transaction "3-NPW," does not have a read type as indicated by the set indication or type bit. Therefore, no further transactions are sent from non-posted queue 330 for processing until acknowledgments using the protocol 144 are received for the outstanding non-posted read transactions "1-NPR" and "2-NPR." When these acknowledgments are received, in an embodiment, the type counter decrements from two to zero. Since the non-posted write transaction "3-NPW" has the same tag (tag 0) as the previous selected non-posted transactions, it is selected for processing and sent to controller 146 if a posted transaction is not selected based on the attributes. An indication, such the type bit, is set to indicate a write type versus a read type. The type counter (not shown) is incremented by one. Selection and processing continues in this manner as described earlier.

Figure 4:
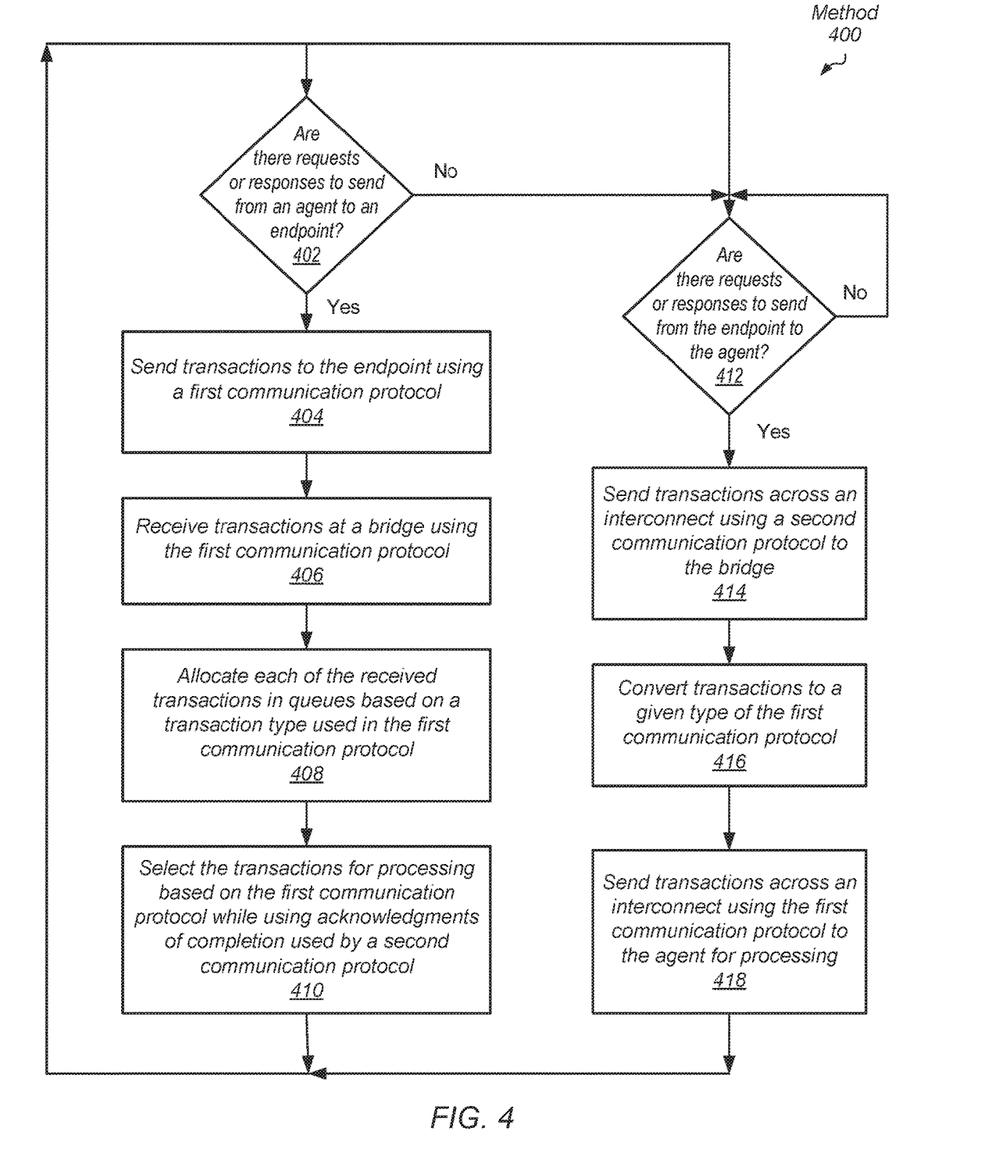
FIG. 4 is a flow diagram of one embodiment of a method for efficiently bridging two communication protocols.

Referring now to FIG. 4, a generalized flow diagram of one embodiment of a method 400 for efficiently bridging two communication protocols is shown. For purposes of discussion, the steps in this embodiment (as well as for FIGS. 6-8) are shown in sequential order. However, in other embodiments some steps may occur in a different order than shown, some steps may be performed concurrently, some steps may be combined with other steps, and some steps may be absent.

In various embodiments, one or more agents generate transactions to be processed by one or more endpoints. In some embodiments, a communication fabric (or fabric) routes traffic among the one or more agents and the one or more endpoints. The one or more agents use a first communication protocol and the one or more endpoints use a second communication protocol that differs from the first protocol with regard to at least the ordering that is enforced between transactions. If there are requests or responses to send from an agent to an endpoint ("yes" branch of the conditional block 402), then transactions are sent to the endpoint using the first communication protocol (block 404). In an embodiment, the first protocol uses the bus protocol peripheral component interconnect (PCI), which includes PCI Express (PCIe). However, other examples of bus protocols supporting ordering dependence rules for posted and non-posted transactions are also possible and contemplated Transactions are received at a bridge using the first communication protocol (block 406). Each of the received transactions is allocated in queues based on a transaction type used in the first communication protocol (block 408). The transactions are sent for processing based on the first communication protocol while using acknowledgments of completion used by a second communication protocol (block 410). In an embodiment, the second protocol uses the bus protocol Advanced eXtensible Interface (AXI) protocol. However, other examples of bus protocols supporting ordering dependence rules based on the operation type and separate physical buses for the different operation types are also possible and contemplated In an embodiment, transactions are selected for processing such that each transaction of a first type used in the first protocol older than a given transaction of a second type used in the first protocol completes with an acknowledgment of completion based on the second protocol prior to selecting the given transaction of the second type.

If there are no requests or responses to send from an agent to an endpoint ("no" branch of the conditional block 402), but there are requests or responses to send from the endpoint to the agent ("yes" branch of the conditional block 412), then transactions are sent across an interconnect using a second communication protocol to the bridge (block 414). Transactions are converted to a given type of the first communication protocol (block 416). For example, in an embodiment, a write transaction in the second protocol is a posted write transaction in the first protocol or a non-posted write transaction in the first protocol. In another example, a response for a read transaction is converted to a completion transaction. Transactions are sent across an interconnect using the first communication protocol to the agent for processing (block 418).

Figure 5:
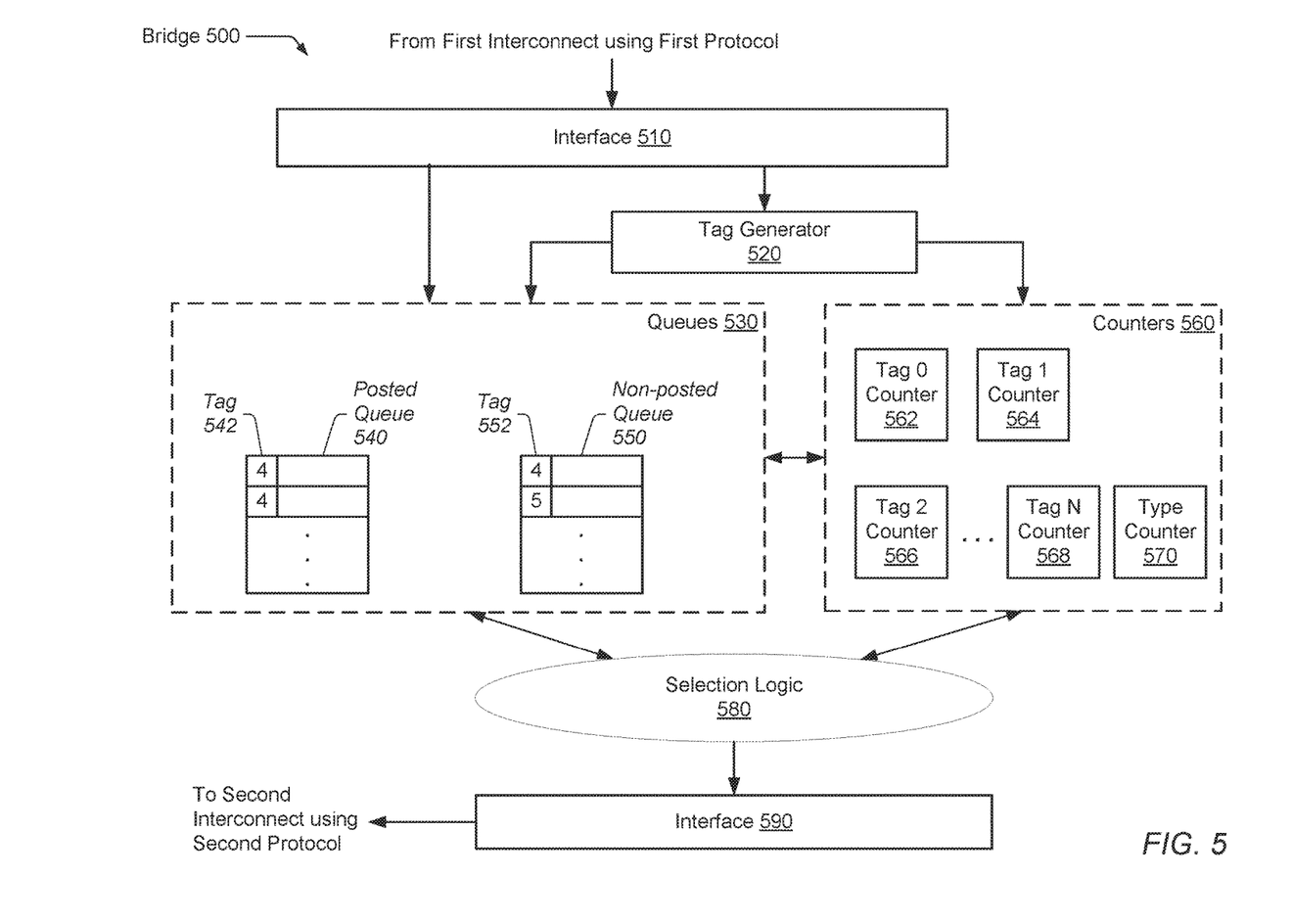
FIG. 5 is a block diagram of one embodiment of a bridge between communication protocols.

Referring to FIG. 5, a generalized block diagram of one embodiment of a bridge 500 between communication protocols is shown. In the illustrated embodiment, bridge 500 includes tag generator 520, queues 530, counters 560 and selection logic 580.

Transactions generated by one or more external agents are received through interface 510 and stored in one of the posted queue 540 and non-posted queue 550 in queues 530. In various embodiments, interface 510 uses the bus protocol peripheral component interconnect (PCI), which includes PCI Express (PCIe), whereas interface 590 uses the bus protocol Advanced eXtensible Interface (AXI) protocol. In other embodiments, other examples of bus protocols supporting ordering dependence rules for posted and non-posted transactions are also possible and contemplated for use in interface 510. Similarly, in other embodiments, other examples of bus protocols supporting ordering dependence rules based on operation type and separate physical buses for the different operation types are also possible and contemplated for use in interface 590. In some embodiments, interface 510 includes control logic for determining whether a received transaction is a posted transaction or a non-posted transaction and selects one of the queues 540 and 550 for allocating an entry for the received transaction. In other embodiments, this control logic is included in queues 530.

In various embodiments, each of posted queue 540 and non-posted queue 550 includes entries for storing information for transactions received via interface 510. Any one of a variety of data storage structures is used for posted queue 540 and non-posted queue 550. For example, data stored in queues 540 and 550 are stored in groups of flip-flops or other types of registers, in random access memory (RAM) cells, in a content addressable memory (CAM) structure, or other. Control logic for accessing entries of queues 540 and 550 is not shown for ease of illustration.

In some embodiments, entries of queues 540 and 550 store a processor core identifier (ID) for identifying a processor core, a transaction ID, a process ID, a portion or a complete memory address targeting data being demanded or prefetched, and a request size of the data being demanded or prefetched or written. In some embodiments, entries of queues 540 and 550 also store an indication specifying whether the corresponding transaction is a demand request, a prefetch request, a write request or a response. Additional information stored in entries of queues 540 and 550 include status information such as one or more of a valid bit, a quality of service (QoS) parameter, age information, and so forth.

In various embodiments, entries of queues 540 and 550 include tag information. For example, posted queue 540 includes tag 542 in each allocated entry and non-posted queue 550 includes tag 552 in each allocated entry. In various embodiments, tags 542 and 552 are generated by tag generator 520 as described earlier. In some embodiments, tag generator 520 also updates tag counters 562-568 in counters 560 as described in earlier examples. As shown, counters 560 also includes type counter 570 used during the selecting and processing of non-posted transactions as described earlier.

In various embodiments, selection logic 580 includes a combination of combinatorial logic and sequential elements for selecting transactions from the posted queue 540 and the non-posted queue 550 for processing based on the first communication protocol while using acknowledgments used by the second communication protocol different from the first communication protocol. Selection logic 580 selects transactions from the posted queue 540 and the non-posted queue 550 for processing such that each transaction in the posted queue 540 older than a given transaction in the non-posted queue 550 completes with an acknowledgment based on the second communication protocol prior to selecting the given transaction in the non-posted queue 550. Selection logic 580 is also used for updating the counters 560 during the selection of transactions for processing.

Figure 6:
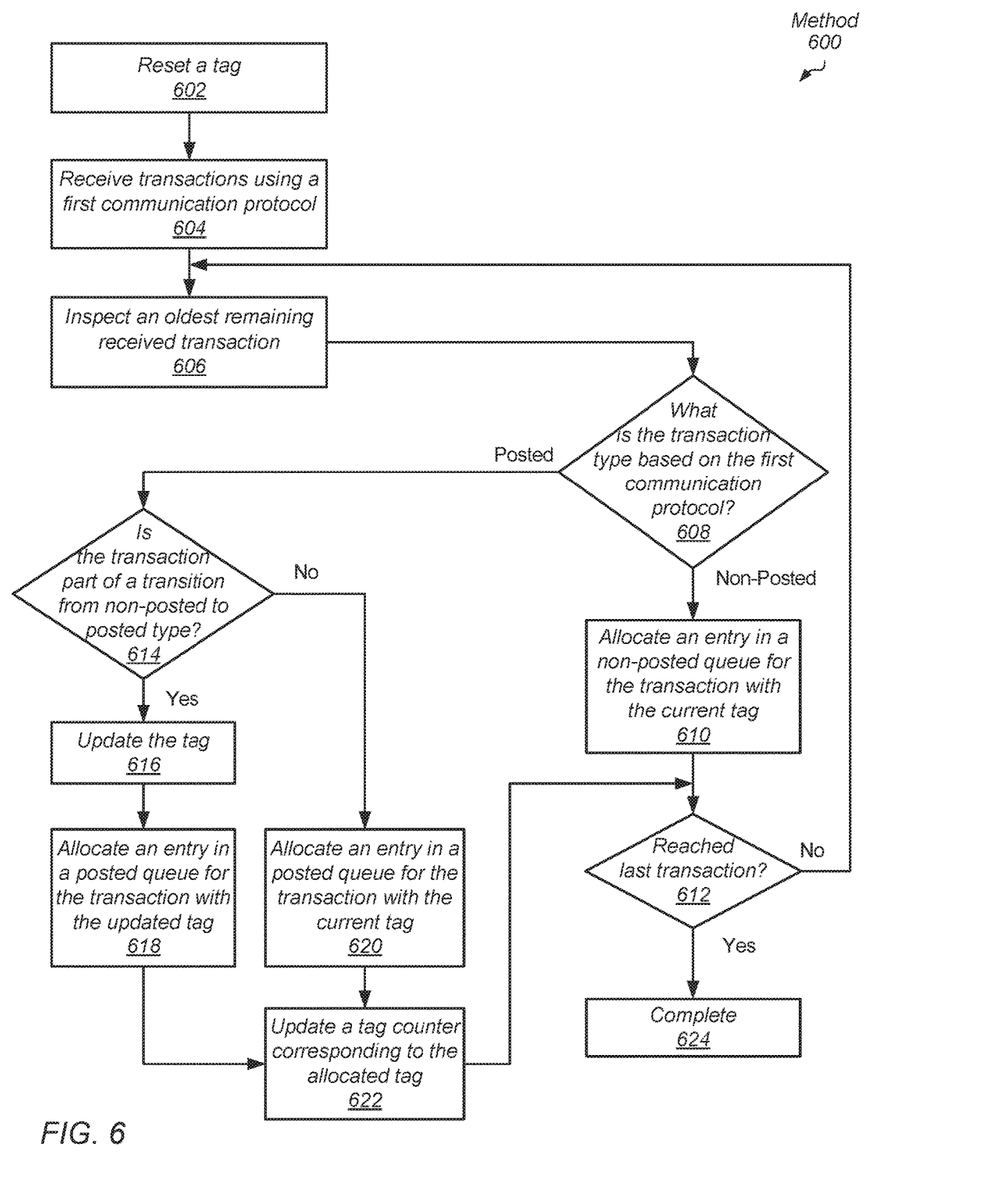
FIG. 6 is a flow diagram of one embodiment of a method for allocating queues used in a bridge between communication protocols.

Referring now to FIG. 6, a generalized flow diagram of one embodiment of a method 600 for allocating queues used in a bridge between communication protocols is shown. A tag is reset (block 602). Transactions are received using a first communication protocol (block 604). An oldest remaining received transaction is inspected (block 606). If the transaction type based on the first communication protocol is a posted transaction type ("posted" branch of the conditional block 608), and if the transaction is part of a transition from non-posted to posted type ("yes" branch of the conditional block 614), then the tag is updated (block 616). In an embodiment, the tag is incremented. An entry in a posted queue is allocated for the transaction with the updated tag (block 618). A tag counter is updated where the tag counter corresponds to the allocated tag (block 622). In an embodiment, this tag counter is incremented.

If the transaction type based on the first communication protocol is a posted transaction type ("posted" branch of the conditional block 608), but the transaction is not part of a transition from non-posted to posted type ("no" branch of the conditional block 614), then an entry in the posted queue is allocated for the transaction with the current tag (block 620). A tag counter corresponding to the allocated tag is updated (block 622). In an embodiment, this tag counter is incremented.

Whether an updated tag or a current tag is allocated in the posted queue, if the last transaction is reached ("yes" branch of the conditional block 612), then the method for storing received transactions in particular queues completes (block 624). Otherwise, if the last transaction is not reached ("no" branch of the conditional block 612), then control flow of method 600 returns to block 606 where an oldest remaining received transaction is inspected. If the oldest remaining transaction type based on the first communication protocol is a non-posted transaction type ("non-posted" branch of the conditional block 608), then an entry in a non-posted queue is allocated for the transaction with the current tag (block 610). Afterward, control flow of method 600 moves to conditional block 612 where it is determined whether the last received transaction is reached.

Figure 7:
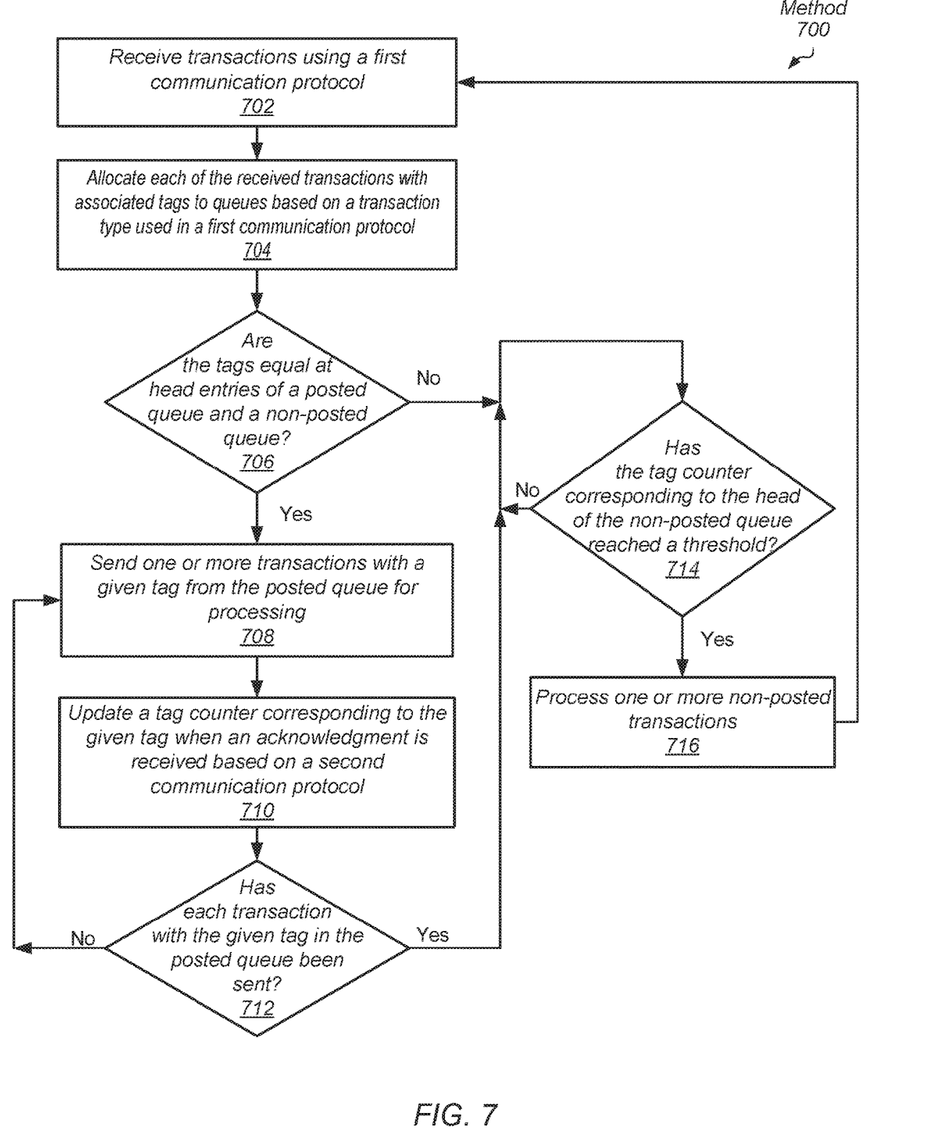
FIG. 7 is a flow diagram of one embodiment of a method for efficiently deallocating a queue corresponding to a first transaction type in a bridge between communication protocols.

Referring now to FIG. 7, a generalized flow diagram of one embodiment of a method 700 for efficiently deallocating a queue corresponding to a first transaction type in a bridge between communication protocols is shown. Transactions are received using a first communication protocol (block 702). Each of the received transactions is allocated with associated tags to queues based on a transaction type used in a first communication protocol (block 704). If the tags at head entries of a posted queue and a non-posted queue are equal ("yes" branch of the conditional block 706), then one or more transactions are sent with a given tag from the posted queue for processing (block 708). In various embodiments, the given tag is the tag allocated in the head entry of the posted queue.

A tag counter corresponding to the given tag is updated when an acknowledgment is received based on a second communication protocol (block 710). If each transaction with the given tag in the posted queue has not been sent ("no" branch of the conditional block 712), then control flow of method 700 returns to block 708 where one or more transactions are sent with a given tag from the posted queue for processing. If each transaction with the given tag in the posted queue has been sent ("yes" branch of the conditional block 712), and the tag counter corresponding to the head of the non-posted queue reached a threshold ("yes" branch of the conditional block 714), then one or more non-posted transactions are processed (block 716). In some embodiments, the tag counter is decremented and the threshold is zero. In various embodiments, while the tags at the heads of the posted queue and the non-posted queue do not match, a posted transaction is possibly selected ahead of the non-posted read transactions in the non-posted queue based on attributes of the transactions at the heads of the two queues. The possible interjection of one or more posted transactions being selected prior to a non-posted transaction continues while the tags at the heads of the posted queue and non-posted queue do not match.

If the tag counter corresponding to the head of the non-posted queue has not reached a threshold ("no" branch of the conditional block 714), then a delay occurs until one or more non-posted transactions are processed. The delay lasts until each required acknowledgment signal or message sent in a second communication protocol has been received for the posted transactions with the given tag. If the tags at head entries of a posted queue and a non-posted queue are not equal ("no" branch of the conditional block 706), then control flow of method 700 moves to conditional block 714 where the tag counter is checked. However, as described earlier, the possible interjection of one or more posted transactions being selected prior to a non-posted transaction based on attributes of the transactions continues while the tags at the heads of the posted queue and non-posted queue do not match.

Figure 8:
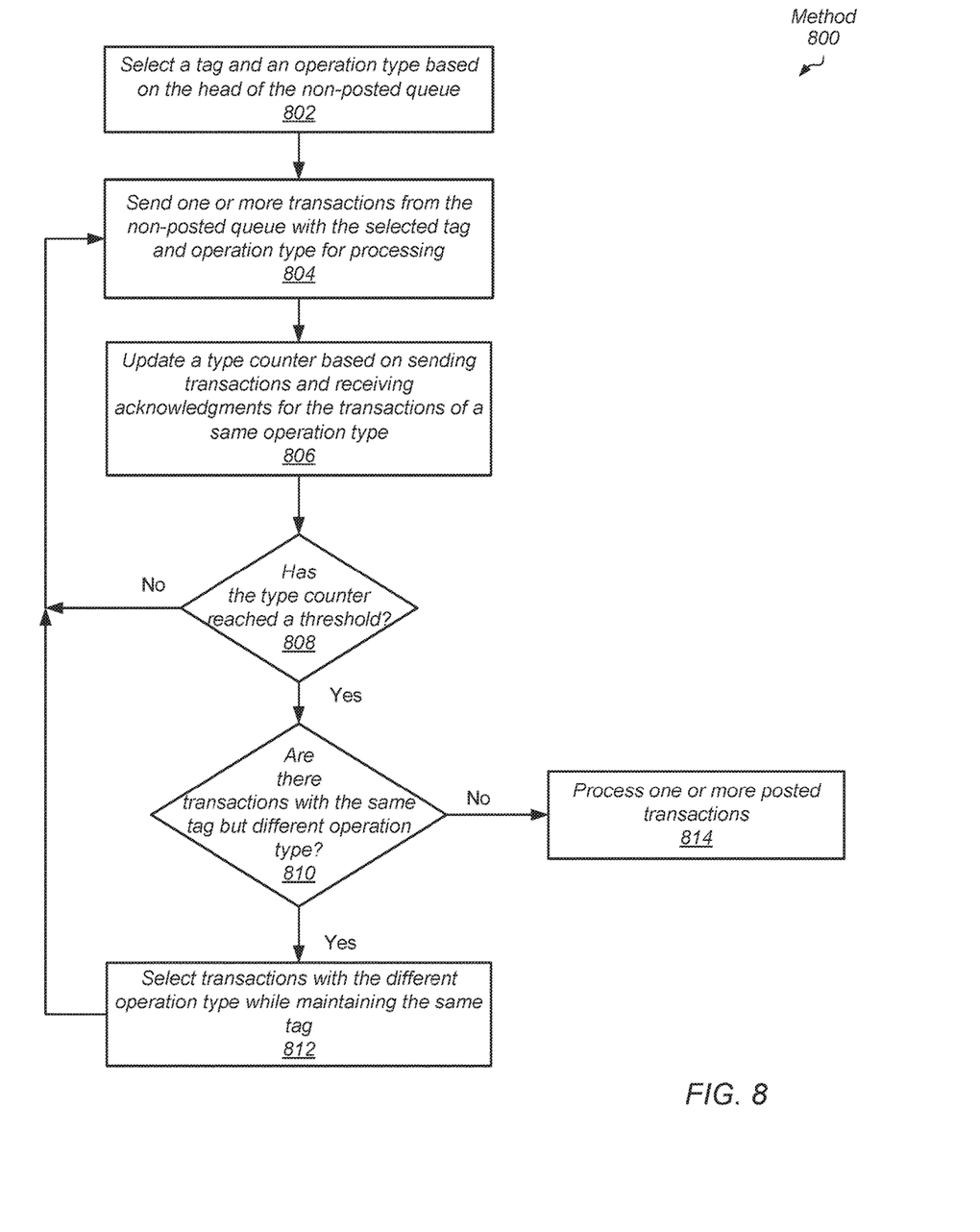
FIG. 8 is a flow diagram of one embodiment of a method for efficiently deallocating a queue corresponding to a second transaction type in a bridge between communication protocols.

Referring now to FIG. 8, a generalized flow diagram of one embodiment of a method 800 for efficiently deallocating a queue corresponding to a second transaction type in a bridge between communication protocols is shown. A tag and an operation type are selected based on the head of the non-posted queue (block 802). One or more transactions are sent from the non-posted queue with the selected tag and operation type for processing (block 804). A type counter is updated based on sending transactions and receiving acknowledgments for the transactions of a same operation type (block 806).

If the type counter has reached a threshold ("yes" branch of the conditional block 808), and there are no transactions with the same tag but different operation type ("no" branch of the conditional block 810), such as there are no read transactions and write transactions with the same tag, then one or more posted transactions are processed (block 814). If the type counter has reached a threshold ("yes" branch of the conditional block 808), and there are transactions with the same tag but different operation type ("yes" branch of the conditional block 810), then non-posted transactions with the different operation type while maintaining the same tag are selected for processing (block 812).

For example, if non-posted read transactions with a given tag have been processed and the type counter has reached zero, then non-posted write transactions with the same given tag are processed.

Figure 9:
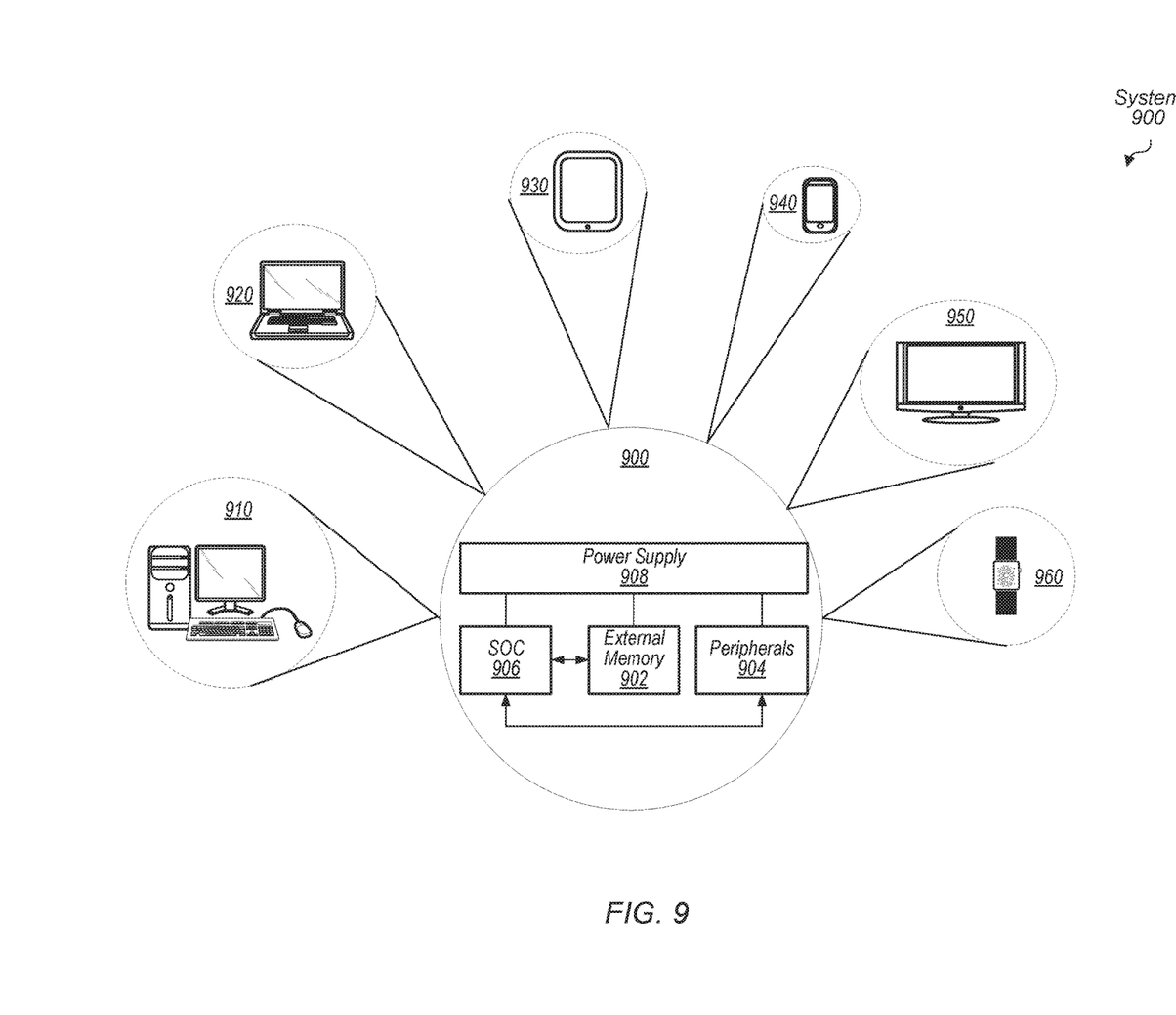
FIG. 9 is a block diagram of one embodiment of a system.

Turning next to FIG. 9, a block diagram of one embodiment of a system 900 is shown. As shown, system 900 may represent chip, circuitry, components, etc., of a desktop computer 910, laptop computer 920, tablet computer 930, cell or mobile phone 940, television 950 (or set top box coupled to a television), wrist watch or other wearable item 960, or otherwise. Other devices are possible and are contemplated. In the illustrated embodiment, the system 900 includes at least one instance of a system on chip (SoC) 906 which includes multiple processors, a communication fabric and at least one bridge for converting traffic between two different communication protocols. For example, in some embodiments, SoC 906 includes agents and endpoints similar to computing system 100 (of FIG. 1). In various embodiments, SoC 906 is coupled to external memory 902, peripherals 904, and power supply 908.

A power supply 908 is also provided which supplies the supply voltages to SoC 906 as well as one or more supply voltages to the memory 902 and/or the peripherals 904. In various embodiments, power supply 908 represents a battery (e.g., a rechargeable battery in a smart phone, laptop or tablet computer). In some embodiments, more than one instance of SoC 906 is included (and more than one external memory 902 may be included as well).

The memory 902 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

The peripherals 904 include any desired circuitry, depending on the type of system 900. For example, in one embodiment, peripherals 904 includes devices for various types of wireless communication, such as Wi-Fi, Bluetooth, cellular, global positioning system, etc. In some embodiments, the peripherals 904 also include additional storage, including RAM storage, solid state storage, or disk storage. The peripherals 904 include user interface devices such as a display screen, including touch display screens or multi-touch display screens, keyboard or other input devices, microphones, speakers, etc.

In various embodiments, program instructions of a software application may be used to implement the methods and/or mechanisms previously described. The program instructions may describe the behavior of hardware in a high-level programming language, such as C. Alternatively, a hardware design language (HDL) may be used, such as Verilog. The program instructions may be stored on a non-transitory computer readable storage medium. Numerous types of storage media are available. The storage medium may be accessible by a computer during use to provide the program instructions and accompanying data to the computer for program execution. In some embodiments, a synthesis tool reads the program instructions in order to produce a netlist including a list of gates from a synthesis library.

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A communication bridge comprising:
  a first interface configured to receive transactions using a first communication protocol;
  a first queue configured to store transactions of a first type used in the first communication protocol, wherein the first type does not require an acknowledgement of completion;
  a second queue configured to store transactions of a second type that requires acknowledgement of completion; and
  control logic configured to:
    store received transactions of the first type in the first queue;

store received transactions of the second type in the second queue;
select a first transaction from the first queue, in response to determining the first transaction is older than any transaction stored in the second queue;
send the selected first transaction for processing; and
wait for an acknowledgment of completion of the selected first transaction before any transaction in the second queue is selected for processing.

2. The communication bridge as recited in claim 1, wherein in response to determining a second transaction is a transaction of the second type and a third transaction is a transaction of the first type, wherein the third transaction is a most recent transaction younger than the second transaction, the control logic is further configured to:
update a tag; and
allocate an entry in the first queue for the third transaction with the updated tag.

3. The communication bridge as recited in claim 1, wherein in response to determining a second transaction is a transaction of a same type as a third transaction, wherein the third transaction is a most recent transaction younger than the second transaction, the control logic is further configured to allocate an entry in one of the first queue and the second queue for the third transaction without updating the tag.

4. The communication bridge as recited in claim 2, wherein the control logic is further configured to allocate an entry in the second queue for the second transaction without the updated tag.

5. The communication bridge as recited in claim 2, wherein the control logic is further configured to store in a given tag counter corresponding to a given tag a number of transactions stored in the first queue with the given tag.

6. The communication bridge as recited in claim 5, wherein in response to determining tags at head positions in each of the first queue and the second queue are equal, the control logic is further configured to send a transaction stored at a head of the first queue for processing.

7. The communication bridge as recited in claim 6, wherein the control logic is further configured to update a tag counter corresponding to the transaction at the head of the first queue responsive to receiving an acknowledgment of completion for the transaction.

8. The communication bridge as recited in claim 7, wherein the control logic is further configured to send a transaction at a head of the second queue for processing, in response to:
determining a tag of a head of the first queue does not match a tag of a head of the second queue; and
determining a tag counter corresponding to the tag of the head of the second queue reached a threshold.

9. The communication bridge as recited in claim 1, wherein the communication bridge further comprises a second interface, and wherein the control logic is further configured to convey selected transactions for processing to the second interface using the second communication protocol.

10. A method, comprising:
receiving, by a first interface, transactions using a first communication protocol;
storing, by a first queue, transactions of a first type used in the first communication protocol, wherein the first type does not require an acknowledgement of completion;
storing, by a second queue, transactions of a second type that requires acknowledgement of completion;
selecting, by control logic, a first transaction from the first queue, in response to determining the first transaction is older than any transaction stored in the second queue;
sending, by the control logic, the selected first transaction for processing; and
waiting, by the control logic, for an acknowledgment of completion of the selected first transaction before any transaction in the second queue is selected for processing.

11. The method as recited in claim 10, wherein in response to determining a second transaction is a transaction of the second type and a third transaction is a transaction of the first type, wherein the third transaction is a most recent transaction younger than the second transaction, the method further comprises:
updating a tag; and
allocating an entry in the first queue for the third transaction with the updated tag.

12. The method as recited in claim 10, wherein in response to determining a second transaction is a transaction of a same type as a third transaction, wherein the third transaction is a most recent transaction younger than the second transaction, the method further comprises allocating an entry in one of the first queue and the second queue for the third transaction without updating the tag.

13. The method as recited in claim 11, further comprising storing in a given tag counter corresponding to a given tag a number of transactions stored in the first queue with the given tag.

14. The method as recited in claim 13, wherein in response to determining tags at head positions in each of the first queue and the second queue are equal, the method further comprises sending a transaction stored at a head of the first queue for processing.

15. The method as recited in claim 14, further comprising updating a tag counter corresponding to the transaction at the head of the first queue responsive to receiving an acknowledgment of completion for the transaction.

16. The method as recited in claim 15, further comprising sending a transaction at a head of the second queue for processing, in response to:
determining a tag of a head of the first queue does not match a tag of a head of the second queue; and
determining a tag counter corresponding to the tag of the head of the second queue reached a threshold.

17. A non-transitory computer readable storage medium storing program instructions, wherein the program instructions are executable by a processor to:
receive transactions using a first communication protocol;
store in a first queue transactions of a first type used in the first communication protocol, wherein the first type does not require an acknowledgement of completion;
store in a second queue transactions of a second type that requires acknowledgement of completion; and
select a first transaction from the first queue, in response to determining the first transaction is older than any transaction stored in the second queue;
send the selected first transaction for processing; and
wait for an acknowledgment of completion of the selected first transaction before any transaction in the second queue is selected for processing.

18. The non-transitory computer readable storage medium as recited in claim 17, wherein in response to determining a second transaction is a transaction of the second type and a third transaction is a transaction of the first type, wherein the third transaction is a most recent transaction younger than the second transaction, the program instructions are further executable by a processor to:
  update a tag; and
  allocate an entry in the first queue for the third transaction with the updated tag.

19. The non-transitory computer readable storage medium as recited in claim 17, wherein in response to determining a second transaction is a transaction of a same type as a third transaction, wherein the third transaction is a most recent transaction younger than the second transaction, the program instructions are further executable by a processor to allocate an entry in one of the first queue and the second queue for the third transaction without updating the tag.

20. The non-transitory computer readable storage medium as recited in claim 18, wherein the program instructions are further executable by a processor to store in a given tag counter corresponding to a given tag a number of transactions stored in the first queue with the given tag.

* * * * *